No. 826,839. PATENTED JULY 24, 1906.
A. FAY.
BUTTER SEPARATOR.
APPLICATION FILED NOV. 5, 1904.
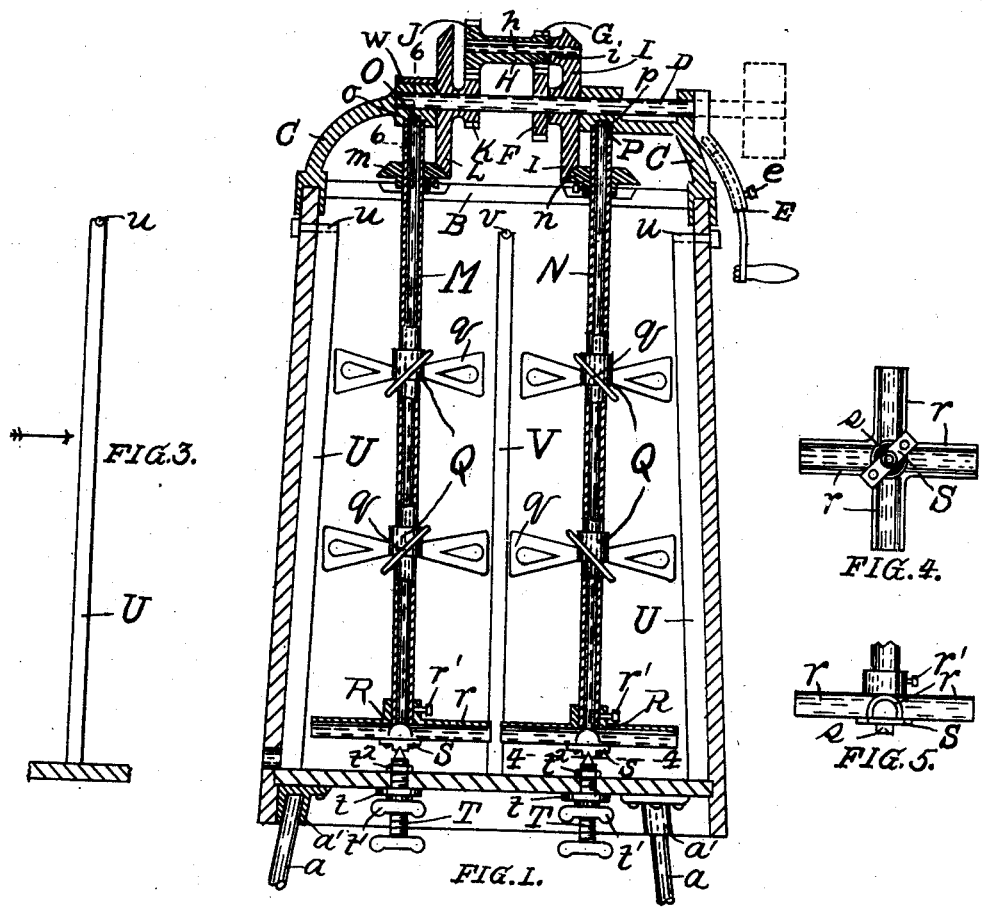
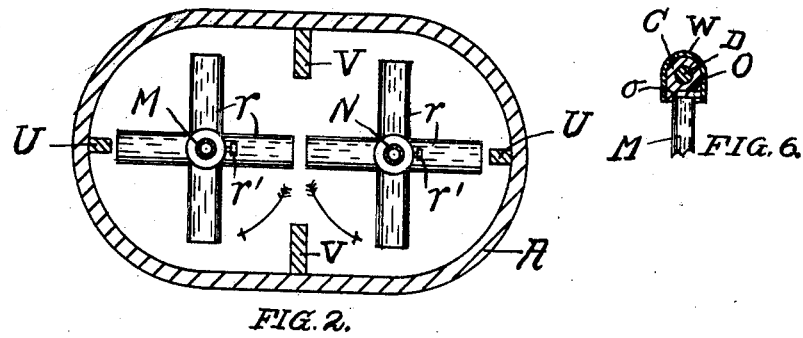
Witnesses.
Inventor.
Alpheus Fay.
By Parkinson + Richards
his Attorneys

UNITED STATES PATENT OFFICE.

ALPHEUS FAY, OF LOUISVILLE, KENTUCKY, ASSIGNOR OF ONE-HALF TO WILLIAM B. JONES, OF CINCINNATI, OHIO.

BUTTER-SEPARATOR.

No. 826,839.　　　Specification of Letters Patent.　　　Patented July 24, 1906.

Application filed November 5, 1904. Serial No. 231,588.

*To all whom it may concern:*

Be it known that I, ALPHEUS FAY, a citizen of the United States, residing at Louisville, in the county of Jefferson and State of Kentucky, have invented certain new and useful Improvements in Butter-Separators, of which the following is a specification.

The object of my invention is to provide improved means for extracting butter from sweet milk or cream by the introduction of air into the milk or cream during the process. The means employed are capable of use in treating large quantities of milk or cream, are simple and easy to operate and keep clean, readily taken apart and assembled and easily packed for shipping, and adjustable for easy running or for change of power or speed.

In the drawings, Figure 1 is a sectional elevation of a separator embodying my invention; Fig. 2, a horizontal section of the same; Fig. 3, an elevation showing the method of mounting damming-strips on the interior wall of the separating-chamber; Fig. 4, a bottom plan view on line 4 4 of Fig. 1; Fig. 5, an elevation of Fig. 4; and Fig. 6, a section on line 6 6 of Fig. 1, showing the cap for regulating the supply of air.

The body A of the separator is of the ordinary upright type provided with legs $a$, secured in sockets $a'$ on the bottom thereof, and is oblong-shaped in horizontal section to conveniently accommodate two sets of rotating agitators. An ordinary lid B, divided into two halves, is provided for closing the top of the separator. Brackets C are secured to the tops of the sides of the separating-chamber and provided with bearings for a shaft D. At one end shaft D is provided with a crank E, which is rendered adjustable in length by means of set-screw $e$. In very large separators for treating large quantities of milk or cream the shaft D may be extended and provided with a pulley driven by power, as indicated in dotted lines in Fig. 1.

A driving-gear F is keyed or otherwise secured on shaft D and meshes with a gear G on a spool or sleeve H, which is keyed on a shaft $h$. The shaft $h$ is mounted in a bearing $i$ in a beveled gear I, which is loosely mounted on shaft D. At its end opposite to gear G spool H carries a gear J, meshing with a gear K, carried by the hub of a beveled gear L, which is loosely mounted on shaft D. The beveled gears I and L mesh, respectively, with beveled gears $m$ and $n$ on hollow shafts M and N, which are rotatably mounted in chamber A and extend through suitable openings in lid B. By this construction it will be seen that upon rotation of shaft D gear F will drive gear G, and consequently gear J, through the medium of spool H; but gear J meshes with gear K on the hub of beveled gear L, so that the latter is rotated by rotation of gear G. As gear L meshes with gear $m$ on shaft M, the latter will thus be driven in the direction indicated by the arrow in Fig. 2. The reaction upon gear J in thus driving shaft M is transmuted by shaft $h$ to gear I, which causes the latter to rotate in a direction opposite to that of gear L and to drive shaft N in the direction indicated by the arrow in Fig. 2. Thus it will be seen that the shafts M and N will be rotated in opposite directions, one under the nfluence of the action and the other under the influence of the reaction from shaft D. As the action and reaction are always equal, an equal amount of power will be transmitted to each shaft M and N and an equilibrium established between the two shafts.

At the upper ends shafts M and N are given a rotatable bearing in sockets O and P on the under side of brackets C. The upper portions of sockets O and P are made smaller than the lower portions to correspond with the bores of shafts M and N and to form annular shoulders $o$ and $p$, against which the upper ends of shafts M and N bear. Holes are made in the walls of brackets C to give access of air to the upper ends of the bore in shafts M and N. The shafts M and N carry agitators Q at different elevations in chamber A and at the bottom combined agitators and air-pumps R. The agitators Q have their blades $q$ inclined to throw the milk or cream upwardly as they rotate. The agitators and pumps R consist of four channeled cross-arms $r$, made in one casting, as shown, and secured to their respective shafts by set-screws $r'$. The bottoms of the channels in cross-arms $r$ are open, and the shafts M and N do not extend below the tops of the channels, so that the center portion of the agitator-pumps between the channels is left open for access of milk or cream from below. It will be noted that as agitator-pumps R, rotate the center portion of the channels remains practically stationary and without centrifugal force, so that milk or cream is free to flow up into that portion of the channels. As the outer portions of the channels travel rapidly, the milk or cream therein is influenced strongly by the centrifugal force and forcibly expelled from the ends of the arms. The tendency to thus create a vacuum forces the milk or cream which naturally rises at the center out into the operative portions of the channels, whence it is forcibly discharged. Thus it will be seen that a constant and rapid flow is induced across the open lower end of the shafts M and N, with the result that air is drawn from the bore thereof by the friction of the passing fluid and introduced into the fluid. A bridge S, carrying a bearing-block s, is secured to each agitator-pump R, as shown, and pointed set-screws T are mounted in the bottom of chamber A in such position as to furnish a bearing for block s. Washer t and jam-nuts t' and t² prevent leaking around set-screws T and serve to lock them in any desired position. By this arrangement an adjustable bearing with a minimum of friction is obtained for the lower end of shaft F.

Damming-strips U and V are secured on the inner periphery of chamber A and interfere with the continuous circular movement of the milk or cream to cause violent agitation thereof. The strips U, located at the ends of chamber A, have an upper bearing against pins or bolts u and a lower bearing against the bottom of the chamber A. These strips are made longer than the vertical distance between the pins u and the bottom of the chamber, so that to secure the strips in position all that is necessary is to engage the upper concaved end with pin u while in an inclined position and force the lower end of the strip toward the vertical through the pin. As the strip is longer than the distance between the pin and the chamber-bottom, it will jam between the two, and thus be locked in position. These strips are inclined toward the direction from which the milk or cream flows against them, so that the force of the flow tends to press the strip farther toward the vertical, and thus more securely lock it in position. The direction of the flow of the milk or cream against strips U is indicated by the arrow in Fig. 3. As shafts M and N rotate in opposite directions, damming-strips V on the sides of chamber A receive the flow on both sides, and so are placed in a vertical position, as shown in Fig. 1. They are made of such length as to be a tight fit between pins v and the chamber-bottom to hold them in position.

Set-screws T, besides furnishing a practically frictionless bearing for shafts M and N, permit delicate adjustments in position thereof to insure the proper relation between shafts M and N and shaft D. By adjusting the length of crank-handle E different speeds and degrees of power may be imparted to shaft D.

I have learned from experience that in treating sweet milk or cream the introduction of air aids materially in the separation; but with sour cream the introduction of air is detrimental. I have therefore provided a cap W, adapted to fit over bracket C and close the openings leading to sockets O and P to exclude the air when desired.

While I have shown and described the preferred means for carrying my invention into effect, this is capable of variation without departing from the spirit of the invention. I therefore do not wish to be confined to the exact construction shown in the drawings; but

What I claim as new, and desire to secure by Letters Patent, is—

1. In a butter-separator, the combination of a separating-chamber; an operating-shaft mounted thereon; a beveled gear loosely mounted on said shaft and carrying eccentrically a pair of rotatable gears connected together; a driving-gear secured to said shaft and meshing with one of the pair of gears; a second beveled gear loosely mounted on said shaft and carrying concentrically a gear meshing with the other of the pair of gears; a pair of agitating-shafts rotatably mounted in the separating-chamber and each carrying a beveled gear meshing with one of the beveled gears on the operating-shaft; and agitators on said agitating-shafts, substantially as specified.

2. In a butter-separator, the combination of a separating-chamber; an operating-shaft mounted thereon; a beveled gear loosely mounted on said shaft and carrying eccentrically a pair of rotatable gears connected together; a driving-gear secured to said shaft and meshing with one of the pair of gears; a second beveled gear loosely mounted on said shaft and carrying concentrically a gear meshing with the other of the pair of gears; a pair of hollow agitating-shafts rotatably mounted in the separating-chamber and each carrying a beveled gear meshing with one of the beveled gears on the operating-shaft; and agitators on said agitating-shafts, substantially as specified.

3. In a butter-separator, the combination of a separating-chamber; an operating-shaft mounted thereon; a beveled gear loosely mounted on said shaft and carrying eccentrically a pair of rotatable gears connected together; a driving-gear secured to said shaft and meshing with one of the pair of gears; a second beveled gear loosely mounted on said shaft and carrying concentrically a gear meshing with the other of the pair of gears; a pair of hollow agitating-shafts rotatably mounted in the separating-chamber and each carrying a beveled gear meshing with one of the beveled gears on the operating-shaft; and agitators on said hollow shafts adapted to induce a flow of fluid across the lower ends of the shafts, substantially as specified.

4. In a butter-separator, the combination of a separating-chamber; an operating-shaft mounted thereon; a beveled gear loosely mounted on said shaft and carrying eccentrically a pair of rotatable gears connected together; a driving-gear secured to said shaft and meshing with one of the pair of gears; a second beveled gear loosely mounted on said shaft and carrying concentrically a gear meshing with the other of the pair of gears; a pair of hollow agitating-shafts rotatably mounted in the separating-chamber and each carrying a beveled gear meshing with one of the beveled gears on the operating-shaft; and an agitator on the bottom of each of said hollow shafts, consisting of a plurality of radiating arms having channels open at the bottom and adapted to induce a flow of fluid across the lower ends of the shafts, substantially as specified.

5. In a butter-separator, the combination of a separator-chamber; an operating-shaft mounted thereon; a beveled gear loosely mounted on said shaft and carrying eccentrically a pair of rotatable gears connected together; a driving-gear secured to said shaft and meshing with one of the pair of gears; a second beveled gear loosely mounted on said shaft and carrying concentrically a gear meshing with the other of the pair of gears; a pair of hollow agitating-shafts in the separating-chamber and each carrying a beveled gear meshing with one of the beveled gears on the operating-shaft; a bearing-block carried by each of said hollow shafts and provided with a conical bearing-recess; adjustable set-screws mounted in the bottom of said chamber and provided with conical points engaging the recess in said bearing-blocks; and agitators on said hollow shafts adapted to induce a flow of fluid across the lower ends of the shafts, substantially as specified.

6. In a butter-separator, the combination of a separating-chamber; an operating-shaft mounted thereon; a beveled gear loosely mounted on said shaft and carrying eccentrically a pair of rotatable gears connected together; a driving-gear secured to said shaft and meshing with one of the pair of gears; a second beveled gear loosely mounted on said shaft and carrying concentrically a gear meshing with the other of the pair of gears; a pair of hollow agitating-shafts in the separating-chamber and each carrying a beveled gear meshing with one of the beveled gears on the operating-shaft; a bearing-block carried by each of said hollow shafts and provided with a conical bearing-recess; adjustable set-screws mounted in the bottom of said chamber and provided with conical points engaging the recess in said bearing-blocks; and an agitator on the bottom of each of said hollow shafts consisting of a plurality of radiating arms having channels open at the bottom and adapted to induce a flow of fluid across the lower ends of the shafts, substantially as specified.

7. In a butter-separator, the combination of a separating-chamber; an operating-shaft mounted thereon; a beveled gear loosely mounted on said shaft and carrying eccentrically a pair of rotatable gears connected together; a driving-gear secured to said shaft and meshing with one of the pair of gears; a second beveled gear loosely mounted on said shaft and carrying concentrically a gear meshing with the other of the pair of gears; a pair of hollow agitating-shafts in the separating-chamber and each carrying a beveled gear meshing with one of the beveled gears on the operating-shaft; a bearing-block carried by each of said hollow shafts and provided with a conical bearing-recess; adjustable set-screws mounted in the bottom of said chamber and provided with conical points engaging the recess in said bearing-blocks; a washer around said set-screws and bearing against the outside of the bottom of the chamber; a jam-nut on said set-screws bearing against said washer; a jam-nut on said set-screws and bearing against the inside of the bottom of the chamber; and agitators on said hollow shafts adapted to induce a flow of fluid across the lower ends of the shafts, substantially as specified.

8. In a butter-separator, the combination of a separating-chamber; an operating-shaft mounted thereon; a beveled gear loosely mounted on said shaft and carrying eccentrically a pair of rotatable gears connected together; a driving-gear secured to said shaft and meshing with one of the pair of gears; a second beveled gear loosely mounted on said shaft and carrying concentrically a gear meshing with the other of the pair of gears; a pair of hollow agitating-shafts in the separating-chamber and each carrying a beveled gear meshing wth one of the beveled gears on the operating-shaft; a bearing-block carried by each of said hollow shafts and provided with a conical bearing-recess; adjustable set-screws mounted in the bottom of said chamber and provided with conical points engaging the recess in said bearing-blocks; a washer around said set-screws and bearing against the outside of the bottom of the chamber; a jam-nut on said set-screw bearing against said washer; a jam-nut on said set-screw and bearing against the inside of the bottom of the chamber; and an agitator on the bottom of each of said hollow shafts consisting of a plurality of radiating arms having channels open at the bottom and adapted to induce a flow of fluid across the lower ends of the shafts, substantially as specified.

9. In a butter-separator, the combination of separating-chamber A, oblong in cross-section; standards C; shaft D; beveled gears L and I loosely mounted on shaft D; gear F secured to shaft D; gears G and J carried by spool H rotatably mounted on gear I; gear K carried by gear L; hollow shafts M and N carrying gears m and n; agitators R on the lower ends of shafts M and N; bearing-blocks S carried by agitators R; and set-screws T in the bottom of the chamber; substantially as specified.

10. In a butter-separator, the combination of separating-chamber A, oblong in cross-section; standards C; shaft D; beveled gears L and I loosely mounted on shaft D; gear F secured to shaft D; gears G and J carried by spool H rotatably mounted on gear I; gear K carried by gear L; hollow shafts M and N carrying gears m and n; agitators Q on the central portions of shafts M and N; agitators R on the lower ends of shafts M and N; bearing-blocks S carried by agitators R; and set-screws T in the bottom of the chamber, substantially as specified.

11. In a butter-separator, the combination of separating-chamber A, oblong in cross-section; standards C; shaft D; damming-strips U and V on the interior walls of said chamber; beveled gears L and I loosely mounted on shaft D; gear F secured to shaft D; gears G and J carried by spool H rotatably mounted on gear I; gear K carried by gear L; hollow shafts M and N carrying gears m and n; agitators Q on the central portions of shafts M and N; agitators R on the lower ends of shafts M and N; bearing-blocks S carried by agitators R; and set-screws T in the bottom of the chamber, substantially as specified.

ALPHEUS FAY.

Witnesses:
WALLACE A. McKAY,
WM. J. OLSON.